No. 744,435. PATENTED NOV. 17, 1903.
I. TENNANT.
PNEUMATIC TIRE.
APPLICATION FILED APR. 17, 1902.
NO MODEL.
Fig. 1.
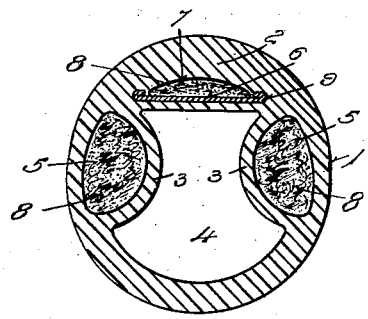
Fig. 2.
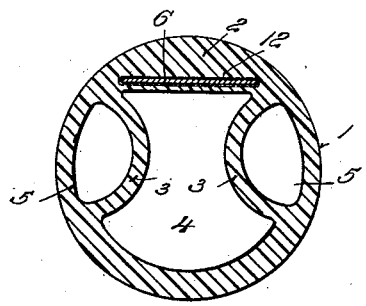
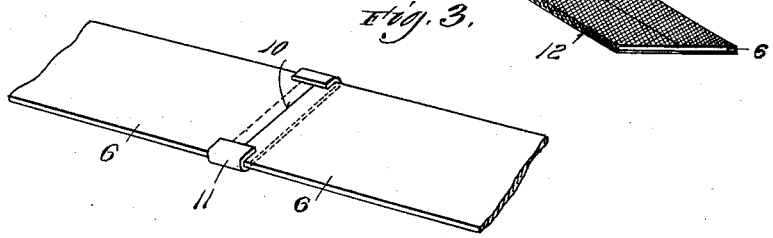
Fig. 3.
Fig. 4.
WITNESSES:
INVENTOR.
BY
ATTORNEY.

No. 744,435. Patented November 17, 1903.

UNITED STATES PATENT OFFICE.

IRVIN TENNANT, OF SPRINGFIELD, OHIO, ASSIGNOR TO TENNANT AUTO-TIRE COMPANY, OF SPRINGFIELD, OHIO, A CORPORATION OF NEW JERSEY.

PNEUMATIC TIRE.

SPECIFICATION forming part of Letters Patent No. 744,435, dated November 17, 1903.

Application filed April 17, 1902. Serial No. 103,253. (No model.)

*To all whom it may concern:*

Be it known that I, IRVIN TENNANT, a citizen of the United States, residing at Springfield, in the county of Clark and State of Ohio, have invented certain new and useful Improvements in Pneumatic Tires, of which the following is a specification, reference being had therein to the accompanying drawings.

This invention relates to pneumatic tires, and has for its object to provide a construction whereby the tire will be prevented from collapsing when in use by reason of being punctured or cut.

To this end my invention consists in certain novel features which I will now proceed to describe and will then particularly point out in the claims.

In the accompanying drawings, Figure 1 is a sectional view of a tire embodying my invention in one form. Fig. 2 is a similar view indicating modifications of certain features thereof. Fig. 3 is a detail perspective view of a portion of the metallic protecting-strip, and Fig. 4 is a detail perspective view of a portion of said strip and its inclosing jacket of wire-cloth.

In the said drawings, 1 indicates the tubular body of the tire, which is constructed of rubber or rubber and fabric in the usual manner and which is provided with a thickened tread portion 2. Within the tire at the sides thereof there are located inwardly-arched diaphragms 3, also preferably formed of rubber or rubber and fabric and of sufficient strength to resist the pressure of the air in the central portion of the tire constituting the air-chamber 4. There is thus formed on each side of the tire a lateral protecting-chamber 5, which is preferably not filled with air under pressure, while the central air-chamber 4 is filled with air under pressure in any suitable manner. The tread portion 2 of the tire has embedded in it an annular flat metallic strip 6 of a width equal to the width of the air-chamber 4 and serving to prevent any access to said air-chamber directly through the tread by any puncturing or cutting object. The lateral air-chambers 5, with their diaphragms 3, serve to protect the central compressed-air chamber 4 at the sides thereof in an obvious manner, so that said compressed-air chamber is protected throughout its exposed surface both at the tread and at the sides.

Where heavy loads are to be carried or where for other reasons greater resiliency is desired, I form in the tread portion of the tire an air-chamber 7, annular in form, in which the protecting-strip 6 is located, as shown in Fig. 1. I may also employ a suitable filling of felt or the like in the chamber 7 and lateral chambers 5, or in either of them, as indicated at 8 in Fig. 1, thus giving additional protection to the tread and sides of the tire. The metallic protecting-strip may have its edges beaded or otherwise enlarged, as indicated at 9 in Fig. 1, or the edges may be plain, as shown in Figs. 2 and 3. In order to allow for the expansion of the tire and to add to its resiliency, I prefer to make the metallic protecting-strip non-continuous, severing it at one or more places, as indicated at 10 in Fig. 3, the severed ends being inserted in a clip 11, which embraces and retains them in position, while permitting them to move toward and from each other to a limited extent.

In order to hold the metallic strip firmly in position in the rubber, so as to prevent it and the rubber from separating and also to prevent the strip from cutting the rubber, I propose to incase or inclose said strip in a jacket 12, of wire-cloth, as shown in Figs. 2 and 4. The rubber will pass through the interstices of this wire-cloth, and in the process of vulcanization the cloth will become firmly embedded in the rubber and will thus hold the rubber in position around the strip and at the same time prevent the strip from cutting the rubber.

It will be observed that the exposed portion of the tire is thoroughly protected, since any cutting or puncturing article passing through the tread will be arrested by the metallic protecting-strip, while any similar objects passing through the side walls of the tire will merely form openings into the lateral chambers and will not affect the central chamber containing air under pressure. If the object is of such dimensions as to extend through the side chamber, it will be arrested by the diaphragm 3, and in case the filling 8 is employed the tire is still further adapted to resist injury at the sides.

I do not wish to be understood as limiting myself to the precise details of construction hereinbefore described, and shown in the accompanying drawings, nor does my invention necessarily contemplate the adoption of all the features set forth in a single embodiment of my invention, since it is obvious that some of the features may be modified or omitted without departing from the principle of my invention.

Having thus fully described my invention, what I claim as new, and desire to secure by Letters Patent, is—

1. A pneumatic tire comprising a tubular body having a thickened tread, lateral inwardly-arched diaphragms extending above and below the central plane of the tire and forming continuous lateral protective chambers, one on each side of the tire, and coextensive with the exposed portions of said sides, and a central chamber for compressed air, a metallic protective strip located in the tread and having a width at least equal to the width of the exposed portion of the central air-chamber, and protective fillings of compressible material located in the lateral protective chambers, substantially as described.

2. A pneumatic tire comprising a tubular body having a thickened tread, lateral inwardly-arched diaphragms forming lateral protective chambers and a central chamber for compressed air, and a metallic protective strip located in the tread and of a width equal to the width of the central air-chamber, said protective strip being divided and being provided at the junction of its ends with a retaining-clip in which said ends may slide, substantially as described.

In testimony whereof I affix my signature in presence of two witnesses.

IRVIN TENNANT.

Witnesses:
E. O. HAGAN,
IRVINE MILLER.